No. 841,681. PATENTED JAN. 22, 1907.
M. E. FRENCH.
KETTLE.
APPLICATION FILED NOV. 16, 1906.

Witnesses
Carl Stoughton
F. G. Campbell.

Inventor
Mary E. French
By Shepherd & Parker
Attorney:

UNITED STATES PATENT OFFICE.

MARY E. FRENCH, OF CLYDE, OHIO.

KETTLE.

No. 841,681.     Specification of Letters Patent.     Patented Jan. 22, 1907.

Application filed November 16, 1906. Serial No. 343,769.

*To all whom it may concern:*

Be it known that I, MARY E. FRENCH, a citizen of the United States, residing at Clyde, in the county of Sandusky and State of Ohio, have invented certain new and useful Improvements in Kettles, of which the following is a specification.

My invention relates to kettles, and has for its object the provision of a device of this character comprising an inner kettle and an outer kettle, the inner kettle being perforated and the bottom of the outer kettle being corrugated to space said inner kettle therefrom to permit a free circulation of water about the inner kettle and also to provide members adapted to coact with a potato-masher when it is desired to mash the vegetables cooked in the inner kettle.

A further object of the invention is the provision of an inner kettle the lower portion of which is perforated to permit and induce a passage of cold air through the vegetables, as will be hereinafter described.

Further objects and advantages of the invention will be set forth in the detailed description which now follows.

Figure 1:
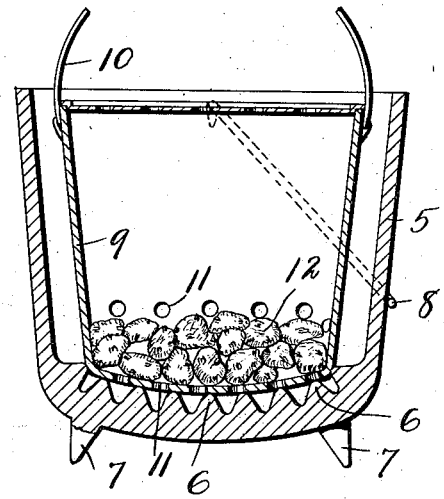
Figure 2:
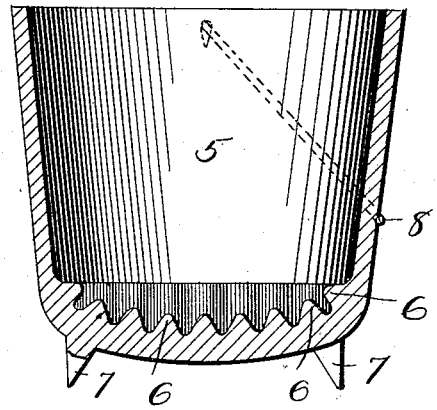
Figure 3:
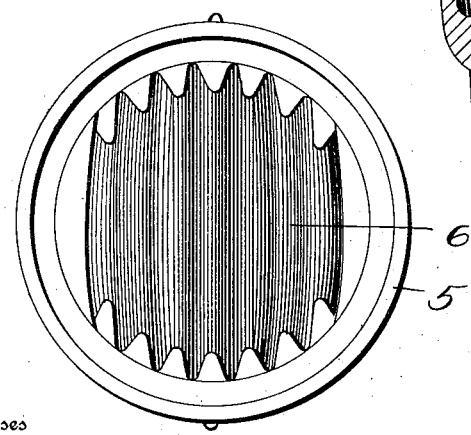

In the accompanying drawings, Figure 1 is a vertical section through the inner and outer kettles. Fig. 2 is a like view of the outer kettle, and Fig. 3 is a plan view of the outer kettle.

Like numerals designate corresponding parts in all of the figures of the drawings.

Referring to the drawings, the numeral 5 designates an outer kettle, the bottom of which presents a plurality of ribs 6. Legs 7 support the outer kettle in the usual and well-known manner, and a handle 8 provides means for lifting this outer kettle. I prefer, as a rule, to construct this outer kettle of cast-iron, although it is to be understood that it may be constructed of other material, if desired.

The ribs 6 serve to support an inner kettle 9. This inner kettle is preferably made of tin, although other material may be used, if desired. A handle 10 provides means for lifting this inner kettle from the outer kettle, and said inner kettle is provided with a series of perforations 11.

The operation of the device is as follows: The outer kettle having been partly filled with water, the inner kettle, containing the vegetables, such as potatoes, (indicated at 12,) is lowered into the outer kettle and rests upon the ribs 6, these ribs serving to space the inner kettle from the walls of the outer kettle. This construction permits a free circulation of water beneath the inner kettle and prevents the vegetables from burning.

After the vegetables have been properly cooked the inner kettle is lifted from the outer kettle, the water draining from the openings 11 and leaving the vegetables unsubmerged. As a rule these vegetables will be in sufficient quantity to cover the walls of the kettle above the perforations 11. The cold air entering through these perforations 11 and passing through the potatoes tends to make them mealy, which is desirable. The water may then be poured from the outer kettle and the potatoes placed in the outer kettle to be mashed, the ribs 6 at this time coacting with the potato-masher (not shown) to thoroughly mash these potatoes.

By virtue of having the supporting-ribs form a part of the outer kettle the inner kettle, which is preferably of tin, presents a smooth outer surface. This renders it easy to scour and cleanse the surface of said kettle.

From the foregoing description it will be seen that simple and efficient means are herein provided for accomplishing the objects of the invention; but while the elements shown and described are well adapted to serve the purposes for which they are intended it is to be understood that the invention is not limited to the precise construction set forth, but includes within its purview such changes as may be made within the scope of the appended claims.

What I claim is—

1. In a device of the character described, the combination with an outer kettle, the body of which is composed of a plurality of ribs which extend across the bottom of said kettle, of a perforated inner kettle, the perforations of which are formed only in the lower part of said inner kettle, said inner kettle being supported upon said ribs.

2. In a device of the character described, the combination with an outer kettle having a plurality of ribs, some of which extend across the bottom of the kettle and others of which extend across the sides of the kettle, of a perforated inner kettle, the perforations of which are formed only in the lower portion of the kettle, the ribs which extend across the bottom of the outer kettle supporting said inner kettle and the ribs which extend across the sides of the kettle spacing said inner kettle from the outer kettle.

In testimony whereof I affix my signature in presence of two witnesses.

MARY E. FRENCH.

Witnesses:
 J. C. CRAIG,
 ALEX HARNDEN.